Patented Oct. 11, 1932

1,882,344

UNITED STATES PATENT OFFICE

KARL TURK, OF BALTIMORE, MARYLAND, ASSIGNOR TO THE PORCELAIN ENAMEL AND MANUFACTURING COMPANY OF BALTIMORE, OF BALTIMORE, MARYLAND, A CORPORATION OF MARYLAND

PRODUCTION OF PORCELAIN ENAMELS

No Drawing.  Application filed April 3, 1931.  Serial No. 527,607.

The present invention relates to the production of porcelain enamels.

In the production of porcelain enamels, the present practice is to carefully compound a raw batch according to a predetermined formula, carefully mix the same, and then charge into a rotary or reverbatory smelting furnace maintained at a smelting temperature. The raw mix is allowed to thoroughly fuse, and after all bubbling ceases, which indicates that chemical action has ceased and a homogeneous mixture has been obtained, the liquid melt is poured from the furnace into water to chill and simultaneously condition it in the form of fine particles capable of being easily ground.

Some enamels, particularly those of dark colors, are allowed to remain in the smelting furnace after smelting is presumed to have been finished, but here the practice is to assure thorough smelting and the temperature is maintained at the normal smelting temperature.

It has been thought necessary in the production of opaque enamels, which derive their opacity from dissolved gases, such as for example those obtained from fluoride compounds, to carefully regulate the temperature of the furnace and to draw off the enamel immediately after cessation of all boiling, which is indicative of complete smelting. Continuation of smelting beyond that point at normal smelting temperatures caused unnecessary volatilization of the opaquing gases.

It has been discovered that porcelain enamels of greatly improved properties may be obtained by allowing the liquid enamel melt after being smelted in the normal smelting time and at the normal smelting temperature to cool down to a temperature substantially below the normal smelting temperature, the cooling occurring over a period of time. In the preferred form of the invention, the liquid enamel is allowed to stand and cool to such a point that its viscosity is greatly reduced, and when poured it flows very slowly. While the point of pouring of the liquid enamel is defined as the temperature at which the enamel becomes very viscous, in some cases it is not desirable or necessary to allow the enamel to stand for such a length of time as to cool it to such a temperature that it becomes very viscous. The time the enamel is cooled and the amount of cooling will, of course, depend on the character of the enamel being treated and the results desired. The point is here made that broadly, cooling for a sufficient length of time confers many desirable properties on the solidified enamel which may be so conditioned by pouring into a vat of water or by equivalent solidifying steps hereinafter pointed out.

It has also been found desirable, in some cases, to maintain the enamel at this lower temperature for a period of time in order to allow the development of these improvements, which might not have had sufficient time to go to completion, due to too rapid a cooling to the viscous temperature.

Enamels produced in accordance with the above have far greater lustre than they would have if they were poured directly into water at their smelting temperatures. There is a considerable improvement in opacity and color. The so treated enamels show a decidedly wider range of temperature between which they will produce a satisfactory finish, and are less susceptible to failure in application, due to improperly prepared or cleaned metal bases. The enamel also shows considerably less tendency to "curl or check". This expression is familiar to those skilled in the enamel art, and is used with reference to the enamel beading in much the same manner as water beads or coalesces on a greasy surface. Tests have also indicated that the acid resistance of the enamel prepared in accordance with the present invention is somewhat increased. The following is an illustrative example of enamel prepared in accordance with the present invention. A cast iron leadless enamel having a normal smelting temperature of 1900° F. when smelted in a rotary smelter in batches of 1,000 pounds, requires approximately three hours to smelt. In ordinary practice, this smelt would be considered thoroughly smelted, and would be poured. However, in accordance with the present invention, the enamel after smelting at the normal smelting temperature and for the normal smelting period, namely three hours, is allowed to stand in the smelter with the heat turned off for a period of about one hour, at which time the enamel is considerably cooled at a temperature varying between 1400 and 1500° F., at which point it is viscous. The enamel after being allowed to stand for the period indicated, is then poured into a trough of water to granulate it into fine particles capable of further grinding.

While in the example illustrated, the fire was turned off, it is conceivable that the same object could be accomplished by so reducing the amount of heat input to such a point that this cooling would eventually occur at a slower rate.

While it is not desired to be bound by any theory of what actually occurs during the time of standing and cooling, it is believed that this period of time and the gradual cooling allows both chemical and physical reaction to occur in the thoroughly smeltered mass. It is not known at the present time just what these reactions are. However, the procedure used and the results obtained have been clearly pointed out, and this complies with the requirements of the patent statutes.

Instead of allowing the completely smeltered enamel to remain in the original smelting furnace, the enamel may be poured into another container and there allowed to stand and cool prior to solidifying.

Instead of solidifying the cooled liquid enamel by introduction into a vat of water, the enamel may be solidified by pouring it onto a rapidly moving surface such as a fast moving continuous belt or wheel turning at a speed which causes the enamel to draw out in the form of very fine threads. Further, the enamel may be solidified by pouring it through an air, steam or any compressed gas jet, which would cause the enamel to form into fine threads and at the same time cool.

The present invention has been illustrated by its application to a batch process. However, the invention is applicable in the continuous smelting of porcelain enamels by regulating the temperature and rate of flow of the enamel from the smelter. In other words, the enamel may be tapped from the melting chamber proper onto an inclined hearth. The rate of flow along the inclined hearth may be so adjusted that the enamel cools during the time it flows from the top to the bottom of the inclined hearth. It is of course clear that the rate of flow of the enamel may be adjusted by adjusting the inclination of the inclined hearth and in this way control the time a given portion of the enamel is on the hearth.

Having thus described the invention, what I claim and desire to secure by Letters Patent is:

1. In the production of porcelain enamels, the steps of allowing a completely smeltered enamel having an opacifying agent present to cool to a temperature substantially below the smelting temperature to allow the opacifying agent to develop its full opacifying qualities, and thereafter solidifying the so-cooled enamel.

2. The process of making porcelain enamels comprising completely smelting an enamel containing an opacifying agent in normal time and at normal temperature, allowing the resulting liquid melt to cool below the final smelting temperature for a predetermined length of time until its viscosity is increased and its rate of flow decreased and the opacifying properties of the opacifying agent have been fully developed, and thereafter solidifying the so-cooled liquid enamel.

3. In the production of porcelain enamels, the steps of allowing a completely smeltered enamel containing an opacifying agent to cool to a temperature substantially below the smelting temperature to increase the viscosity of the enamel, decrease its rate of flow and allow the opacifying properties of the opacifying agent to be fully developed, and thereafter solidifying the so-cooled enamel.

4. In the production of porcelain enamels by a continuous smelting process, the step of completely smelting an enamel containing an opacifying agent in a smelting furnace and allowing the liquid enamel to cool by regulating the temperature and rate of withdrawal of the liquid enamel during the period of withdrawal from the furnace whereby the opacifying properties of the opacifying agent are fully developed.

5. In the production of porcelain enamels containing an opacifying agent, the steps of allowing completely smeltered enamel to cool to a temperature substantially below the smelting temperature to permit the opacifying agent to develop its full opacifying properties, and thereafter solidifying by granulation the so-cooled enamel.

6. In the production of porcelain enamels containing an opacifying agent, the step of allowing completely smeltered enamel to cool to a temperature substantially below the smelting temperature to permit the opacifying agent to develop its full opacifying properties, and thereafter solidifying the so-cooled enamel by pouring the same on a rapidly moving surface adapted to cause the enamel to draw out into very fine threads.

7. In the production of porcelain enamels containing an opacifying agent, the steps of allowing a completely smeltered enamel to cool to a temperature substantially below the smelting temperature to permit the opacifying agent to develop its full opacifying properties, and thereafter solidifying the so-cooled enamel by contacting the same with compressed air.

8. The process of making porcelain enamel comprising completely smelting an enamel in normal time and at normal temperature, cooling the resulting liquid melt substantially below the final smelting temperature for a substantial period of time to permit a refining action to occur whereby the properties of the final enamel are improved, and then solidifying the so-cooled liquid enamel.

9. The process of making porcelain enamel comprising smelting a porcelain enamel containing an opacifying agent in normal time and at normal temperature, cooling the resulting liquid melt substantially below the final smelting temperature for a substantial period of time to permit a refining action to occur and allow the opacifying agent to develop its full opacifying properties, and then solidifying the so-cooled liquid enamel.

In testimony whereof I hereunto affix my signature.

KARL TURK.